United States Patent [19]
Larka et al.

[11] 3,732,536
[45] May 8, 1973

[54] PASSIVE OBJECT DETECTION APPARATUS INCLUDING AMBIENT NOISE COMPENSATION

[75] Inventors: Vincent E. Larka, Burlington; Larry Wilharm, Sandwich, both of Mass.

[73] Assignee: GTE Sylvania Incorporated, Seneca Falls, N.Y.

[22] Filed: Sept. 18, 1970

[21] Appl. No.: 73,316

[52] U.S. Cl. .............................. 340/16 R, 340/31 R
[51] Int. Cl. .............................................. H04b 11/00
[58] Field of Search ........................ 340/5 R, 6 R, 15, 340/16 R, 258 D, 261, 31 R, 34

[56] References Cited

UNITED STATES PATENTS

| 3,159,807 | 12/1964 | Asbury, Sr. | 340/6 R |
| 3,268,856 | 8/1966 | Wallen, Jr. | 340/15 |
| 3,588,803 | 6/1971 | Fleming, Jr. et al. | 340/16 R |

Primary Examiner—Richard A. Farley
Attorney—Norman J. O'Malley, Elmer J. Nealon and Peter Xiarhos

[57] ABSTRACT

An ambient noise compensating arrangement for use in a passive ultrasonic vehicle detection apparatus carried by a vehicle for compensating for ambient background noise present during the detection of vehicles located in predetermined regions of surveillance rearward of the subject vehicle. Prior to the detection of the presence of a vehicle in one of the regions of surveillance, the prevailing ambient background noise is sensed by a signal-receiving horn member mounted on the subject vehicle and processed by an input signal arrangement coupled to the horn member to produce a noise voltage signal representative of the ambient background noise. The noise voltage signal is applied to a field effect transistor the resistance of which is increased in response to the noise voltage signal by an amount sufficient to essentially fully attenuate the noise voltage signal.

When a vehicle subsequently enters the region of surveillance rearward of the subject vehicle, after the aforementioned ambient noise compensation, various signals including ultrasonic signals generated inherently by the vehicle, due to a combination of factors such as engine and body vibrations, and engine and tire noises, are received by the signal-receiving horn member and applied to a piezoelectric crystal transducer provided in the input signal arrangement. The piezoelectric transducer has a predetermined resonant frequency equal to the frequency of particular ultrasonic signals generated inherently by all existing engine-driven road vehicles. The piezoelectric transducer operates in response to the various signals received from the horn member to produce an output voltage which is greatest for ultrasonic signals of the predetermined resonant frequency. The output voltage produced by the piezoelectric transducer is then processed to provide an indication to the operator of the subject vehicle of the presence of the vehicle in the region of surveillance.

22 Claims, 4 Drawing Figures

PASSIVE OBJECT DETECTION APPARATUS INCLUDING AMBIENT NOISE COMPENSATION

BACKGROUND OF THE INVENTION

The present invention relates to a signal processing apparatus for an object detection apparatus. More particularly, it is concerned with an ambient noise compensating arrangement for use in a passive vehicle detection apparatus associated with a vehicle for compensating for ambient background noise present during the detection of vehicles located in predetermined regions or zones rearward of the subject vehicle.

It is often necessary for the operator of a vehicle such as an automobile, truck, or bus to know whether another vehicle is approaching the subject vehicle from behind in an adjacent lane, or is present in a "blind" zone, before making a lane change or taking other appropriate action. This type of information is particularly useful to operators of many types of trucks and buses where interior rear view mirrors such as commonly used in automobiles in conjunction with side rear view mirrors for vehicle detection purposes cannot be used due to the size or construction of the vehicle. In such cases, reliance is presently placed almost entirely on one or more exterior rear view mirrors located on each side of the vehicle. While side rear view mirrors, whether for automobiles, trucks, or buses provide a certain amount of useful information to an operator, the size and location of such mirrors severely restrict the rear field of view to a very small region. The rear field of view is even further limited under poor weather conditions, as in rain, snow, or fog. In addition, side rear view mirrors require frequent adjustment to be fully effective.

A variety of other object detection arrangements have been proposed heretofore for use with a vehicle for detecting and indicating the presence of other vehicles approaching the subject vehicle from the rear. In one such system, which is active in nature, a transmitter-receiver arrangement is carried by a vehicle for transmitting sonic or ultrasonic time-spaced or continuous-wave signals in a rearward direction and for receiving and processing the signals reflected from an object present in the path of the transmitted signal, such as a vehicle, thereby to provide an indication to the operator of the presence of the object. A significant disadvantage of such a system is that it is unable to discriminate between the particular target which it is desired to detect, that is, an unseen vehicle approaching from the rear, and fixed objects such as signs, fences, trees, and the like. Thus, all objects appear to an operator as targets. While it has been proposed to solve the above-mentioned problem by means of apparatus such as Doppler-shift apparatus, such apparatus is complicated and very costly, particularly when considered for use in high-volume, mass-produced vehicles, such as automobiles and trucks, where cost is an important factor. Another disadvantage of active systems of the above type is that they require both transmitting and receiving apparatus, thereby adding to system costs.

To avoid many of the abovementioned problems and disadvantages associated with vehicular rear view mirror arrangements and active vehicle detection arrangements, a passive ultrasonic vehicle detection apparatus has recently been proposed for use with a vehicle for detecting the presence of another vehicle approaching the subject vehicle, for example, in a travel lane adjacent to the travel lane of the subject vehicle or in a so-called "blind" zone of the subject vehicle, by "listening" for the approaching vehicle. More specifically, the presence of an approaching vehicle in an adjacent travel lane or "blind" zone is ascertained by detecting and processing various signals including ultrasonic signals generated inherently and naturally by the approaching vehicle. The various signals are generated by the approaching vehicle due to a combination of factors such as engine and body vibrations, and engine and tire noises. To process the various signals produced by the approaching vehicle, the signals are collected by a signal-receiving horn member mounted in a rearward location of the subject vehicle and applied to an ultrasonic transducer having a predetermined resonant frequency equal to the frequency of particular ultrasonic signals generated inherently by all existing engine-driven road vehicles, for example, 40 kilohertz. The ultrasonic transducer, typically a piezoelectric crystal transducer, operates in response to the various signals received from the signal-receiving horn member to produce an output voltage which is greatest for ultrasonic signals of the predetermined resonant frequency. The output voltage produced by the ultrasonic transducer is then processed by various processing circuits coupled to the ultrasonic transducer, including circuits for rejecting signals caused by spurious low-level background noises or shock stimuli, to provide an indication to the operator of the subject vehicle of the presence of the approaching vehicle in the adjacent lane or blind zone.

The above described passive ultrasonic vehicle detection apparatus operates in a generally satisfactory manner. However, actual extensive testing and experimentation have indicated that the extent of discrimination provided by the passive ultrasonic vehicle detection apparatus between signals generated by vehicles and ambient background noise, the latter often varying widely form one traffic situation to another, is less than optimum. It is a principal object of the present invention, therefore, to provide a passive object detection apparatus, and, in particular, a passive ultrasonic object detection apparatus such as that described hereinabove, having improved discrimination between signals generated by vehicles and ambient background noise.

BRIEF SUMMARY OF THE INVENTION

Briefly, in accordance with the invention, a signal processing apparatus is provided for a passive object detection apparatus which is employed in connection with a first object for detecting and indicating, in the presence of ambient noise signals, the presence of another object in a region of surveillance adjacent to the first object. By way of example, both of the objects may be motor vehicles and the region of surveillance adjacent to the first vehicle may be a travel lane adjacent to the first vehicle or a blind zone thereof. In accordance with the invention, the presence of an object in the region of surveillance adjacent to the first object is ascertained by receiving and processing various signals inherently generated by the object while present in the region of surveillance.

The ambient noise signals and the signals inherently generated by an object present in the region of surveillance adjacent to the first object are received by a signal-receiving means provided in the passive object detection apparatus, and applied to an input means. The input means operates in response to the various signals received thereby to produce voltage signals representative of the signals. The voltage signals are applied to an attenuation means which distinguishes between ambient noise signals and signals inherently generated by an object while present in the region of surveillance on the basis of the values of the time durations of the various voltage signals produced by the input means in response to the ambient noise signals and in response to the signals inherently generated by the object. More specifically, when voltage signals are received by the attenuation means which exceed a predetermined time duration, for example, the maximum time duration that an object is expected to be present in the region of surveillance, the attenuation means operates to attenuate these voltage signals by an amount in accordance with the amplitude thereof and these signals are considered as corresponding to ambient noise signals. Subsequent signals received by the attenuation means and having a duration equal to or less than the predetermined time duration are attenuated by the attenuation means by only the aforementioned amount and are considered as corresponding to signals inherently generated by an object in the region of surveillance. An output means coupled to the attenuation means operates during the operation of the attenuation means to attenuate signals having a duration exceeding the predetermined time duration to produce a corresponding first output indication and, during the operation of the attenuation means to attenuate signals having a duration equal to or less than the predetermined time duration, to produce a corresponding second output indication.

BRIEF DESCRIPTION OF THE DRAWING

Additional objects, features, and advantages of passive object detection apparatus in accordance with the present invention will be apparent from the following detailed discussion and the accompanying drawings in which.

Figure 1:
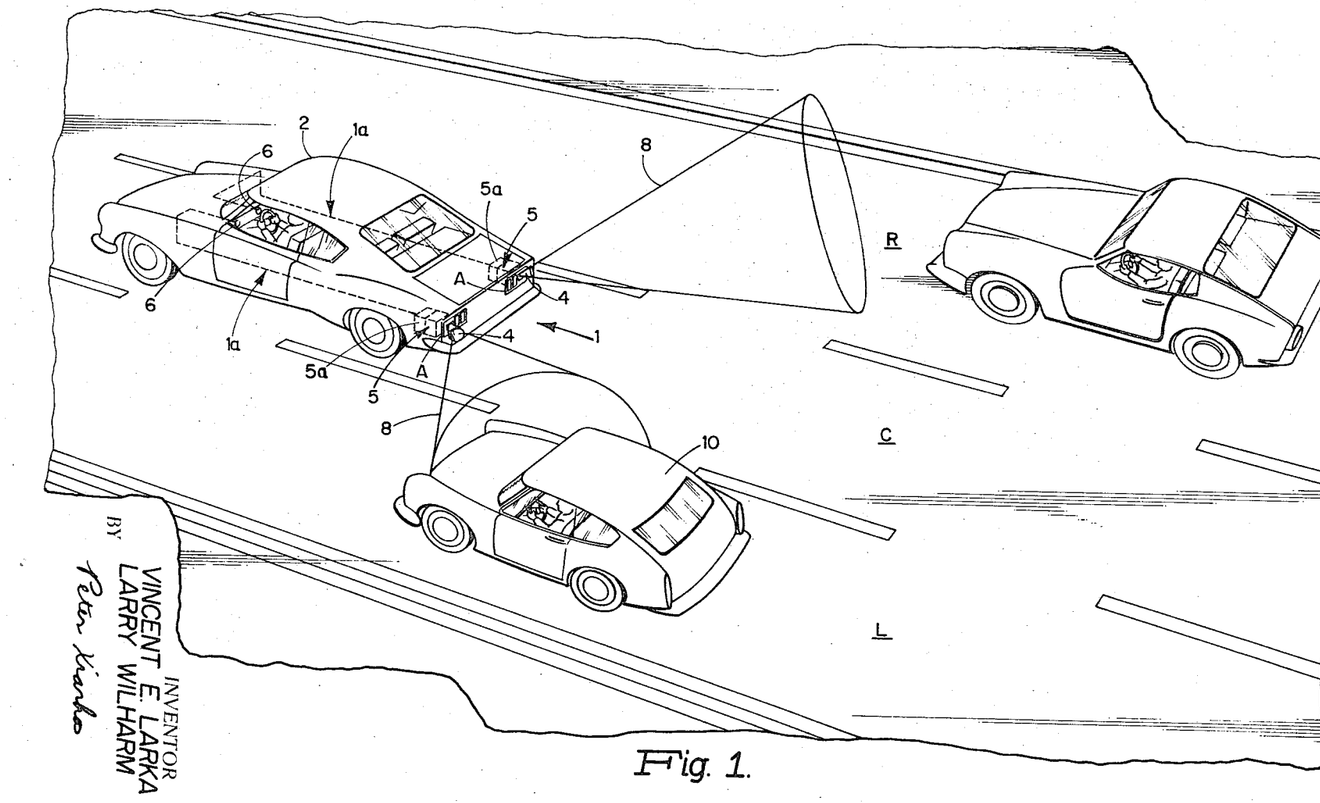
FIG. 1 illustrates a passive ultrasonic vehicle detection apparatus in accordance with the present invention as employed with an automobile to detect and indicate the presence of other automobiles in travel lanes adjacent to the travel lane of the subject automobile or in blind zones of the subject automobile.
Figure 2:
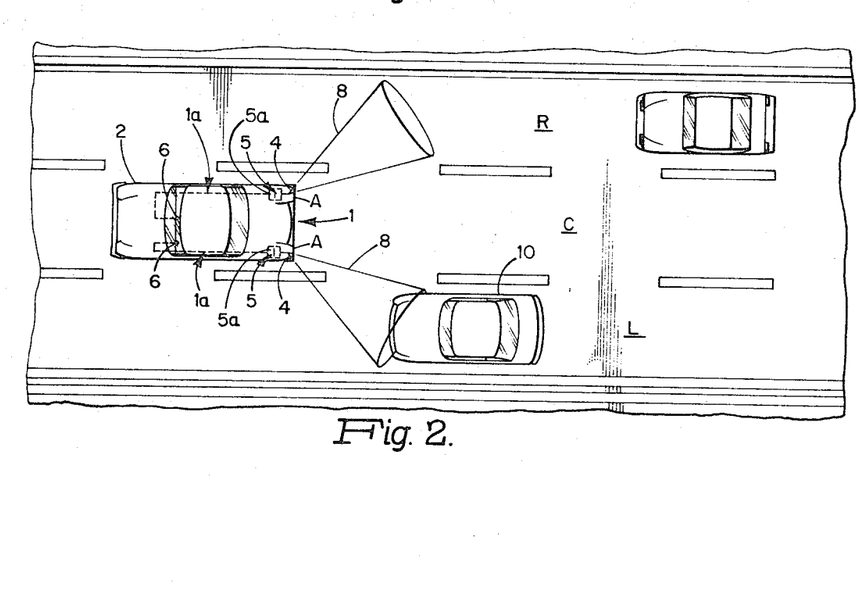
FIG. 2 is a top view of the arrangement shown in FIG. 1.

GENERAL DESCRIPTION—FIGS. 1 AND 2

Referring to FIGS. 1 and 2, there is shown a passive ultrasonic vehicle detection apparatus 1 in accordance with the present invention as employed with an automobile 2. As indicated in FIGS. 1 and 2, the passive ultrasonic vehicle detection apparatus 1 comprises a pair of identical passive ultrasonic receiving arrangements 1a, each comprising, in a series arrangement, a signal-receiving horn member 4, a signal processing arrangement 5, and an indicator 6. Although the signal-receiving horn members 4 may assume a variety of possible physical configurations and be physically mounted at a variety of locations of the automobile 2, it is preferred that each of the signal-receiving horn members 4 have a frusto-conical (or "frustum") configuration, as shown more clearly in FIG. 3, and be positioned within a small opening provided in a corresponding rear tail-light assembly A. Furthermore, to provide optimum effectiveness, the signal receiving horn members 4 should cant outwardly slightly from the travel lane C of the automobile 2 toward the adjacent right and left travel lanes R and L. With the above configuration and positioning for the signal-receiving horn members 4, corresponding zones or regions of surveillance 8 of essentially the same configuration as the signal-receiving horn members 4 are established rearwardly of the automobile 2 and adjacent the right and left lanes R and L and enveloping any existing rear "blind" zones of the automobile 2.

As will be described in detail hereinafter, each of the signal processing arrangements 5 includes an ambient noise compensating arrangement 5a for the purpose of compensating for ambient background noise present during the detection of vehicles in the regions of surveillance 8. More specifically, prior to the detection of approaching vehicles in the regions of surveillance 8, during a so-called "noise compensating" period, the prevailing ambient background noise is collected, or "sensed," by both of the signal-receiving horn members 4 and applied to the associated signal processing arrangements 5. Signals representative of the ambient background noise are then produced in the signal processing arrangements 5 and applied to the ambient noise compensating arrangements 5a provided therein. In response to these signals, the ambient noise compensating arrangements 5a operate to adjust their input threshold operating levels by an amount in accordance with the level of the ambient background noise so as to eliminate the effects of the ambient background noise during the subsequent detection of vehicles.

After the above mentioned adjustment for ambient background noise, the detection of vehicles may then be readily accomplished. As in the case of the aforedescribed prior art passive ultrasonic vehicle detection apparatus, the presence of an approaching vehicle is detected by detecting various signals generated naturally and inherently by the approaching vehicle. More specifically, when a vehicle enters one of the regions of surveillance 8, such as an automobile 10 as shown in FIGS. 1 and 2, and only at such time, the corresponding signal-receiving horn member 4 receives the various signals including ultrasonic signals generated naturally and inherently by the vehicle and applies these signals to the associated signal processing arrangement 5.

The signal processing arrangement 5 then operates to process the various signals received from the signal receiving horn member 4 to energize its associated indicator 6 thereby to indicate to the operator of the automobile 2 the presence of the approaching vehicle in the associated region of surveillance 8. The indicators 6 shown in FIGS. 1 and 2 may be placed within the instrument panel or on the dashboard of the automobile 2 or in any other suitable location. The signal processing arrangement 5 employed in each of the passive ultrasonic receiving arrangements 1a of FIGS. 1 and 2 is shown in greater detail in FIG. 3.

Figure 3:
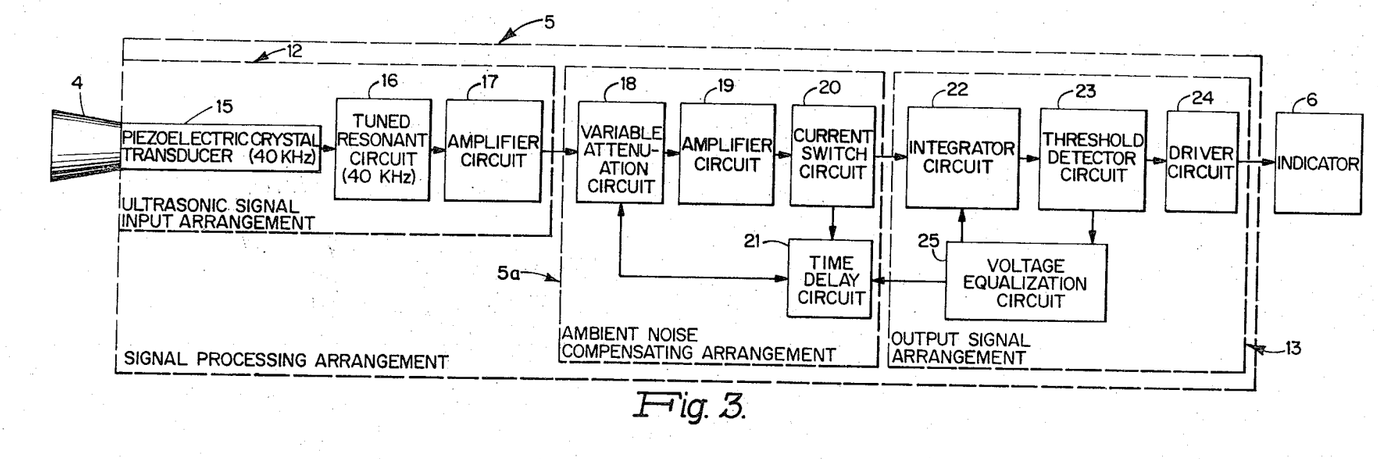
FIG. 3 is a block diagram of a passive ultrasonic receiving arrangement employed in the passive ultrasonic vehicle detection apparatus of FIG. 1 and including an ambient noise compensating arrangement in accordance with the present invention.

SIGNAL PROCESSING ARRANGEMENT—FIG. 3

As shown in FIG. 3, the signal processing arrangement 5 generally comprises an ultrasonic input signal arrangement 12, the aforementioned ambient noise compensating arrangement 5a, and an output signal arrangement 13. The ultrasonic input signal arrangement 12 comprises, in a series arrangement, a piezoelectric crystal transducer 15, a tuned resonant circuit 16, and an amplifier circuit 17. The ambient noise compensating arrangement 5a includes a variable attenuation circuit 18, an amplifier circuit 19, and a current switch circuit 20, arranged in series with the ultrasonic signal input arrangement 12, and, in addition, a time delay circuit 21 connected in a feedback path between the current switch circuit 20 and the variable attenuation circuit 18. The output signal arrangement 13 comprises an integrator circuit 22, a threshold detector circuit 23, and a driver circuit 24, arranged in series with the current switch circuit 20, and, in addition, a voltage equalization circuit 25 connected to the integrator circuit 22, the threshold detector circuit 23, and to the time delay circuit 21. The operation of the signal processing arrangement 5 is as follows.

AMBIENT NOISE COMPENSATING OPERATION—FIG. 3

Prior to a vehicle entering the region of surveillance 8 associated with the signal-receiving horn member 4, the ambient background noise is collected, or "sensed," by the signal-receiving horn member 4 and applied to the ultrasonic input signal arrangement 12. The ultrasonic input signal arrangement 12, to be described in greater detail hereinafter, operates in response to the ambient background noise to produce a noise voltage signal at the output of the amplifier circuit 17 representative of the ambient background noise. The noise voltage signal is applied to the variable attenuation circuit 18 and is initially passed therethrough, substantially without attenuation, to the amplifier circuit 19. After amplification by the amplifier circuit 19 to achieve a suitable operating level, the noise voltage signal is applied to the current switch circuit 20, and causes the current switch circuit 20 to supply current to the integrator circuit 22 and also to the time delay circuit 21.

The integrator circuit 22 operates in response to the current from the current switch circuit 20 to establish a progressively increasing output voltage which is detected by the threshold detector circuit 23. The threshold detector circuit 23 is adapted to produce an output signal when a predetermined input threshold voltage level associated therewith is exceeded by the output voltage of the integrator circuit 22. The value of the input threshold voltage level of the threshold detector circuit 23 is established to be less than the maximum value of the output voltage established by the integrator circuit 22, during either a noise compensating operation or, as will be described hereinafter, during a vehicle detection operation. When the output voltage of the integrator circuit 22 reaches the input threshold voltage level of the threshold detector circuit 23, an output signal is produced by the threshold detector circuit 23 and applied to the driver circuit 24. The driver circuit 24 then operates to energize the indicator 6. The energization of the indicator 6 at this times serves to inform the operator of the vehicle that the noise compensating operation has been initiated. The indicator 6 remains energized until the output voltage of the integrator circuit 22 falls below the value of the input threshold voltage level of the threshold detector circuit 23, which action occurs when the noise compensating operation is essentially complete and which is initated by the time delay circuit 21 in a manner now to be described.

As mentioned earlier, at the same time as current is supplied to the integrator circuit 22 by the current switch circuit 20, current is also supplied by the current switch circuit 20 to the time delay circuit 21. The time delay circuit 21 operates in response to the current from the current switch circuit 20 to produce and apply to the variable attenuation circuit 18 a feedback output voltage for the purpose of attenuating the noise voltage signal at the input of the variable attenuation circuit 18. The feedback output voltage produced by the time delay circuit 21 is also delayed with respect to the initial receipt of current from the current switch circuit 20, however, and as will be described in detail hereinafter, the time delay characteristic of the time delay circuit 21 is principally relied upon during subsequent vehicle detection. The variable attenuation circuit 18 operates in response to the feedback output voltage produced by the time delay circuit 21 to progressively attenuate, in a damped feedback fashion, the noise voltage signal present at its input. As the above attenuation operation takes place and the amount of attenuation of the noise voltage signal increases, the amplitude of the output voltage of the amplifier circuit 19 decreases, and the amount of current supplied by the current switch circuit 20 to the integrator circuit 22 and to the time delay circuit 21 decreases. As a result, the values of the output voltages of both the integrator circuit 22 and the time delay circuit 21 also decrease. As will be described in detail hereinafter, the output voltage of the integrator circuit 22 decreases until it reaches a final, steady-state value corresponding to the level of the ambient background noise and indicating that the noise voltage signal presented to the input of the variable attenuation circuit 18 has been essentially completely attenuated.

As the value of the output voltage of the integrator circuit 20 decreases toward its final, steady-state value and falls below the value of the input threshold voltage level of the threshold detector circuit 23, the output signal previously produced by the threshold detector circuit 23 is terminated. The driver circuit 24 then operates to de-energize the previously energized indicator 6, thereby indicating to the operator of the vehicle that the noise compensating operation is essentially complete.

As a final step in the noise compensating operation, in preparation for detecting the presence of a vehicle in the region of surveillance 8, the feedback output voltage of the time delay circuit 21, which, as stated above, also decreases as the attenuation provided by the variable attenuation circuit 18 increases and the current supplied to the time delay circuit 21 by the current switch circuit 20 decreases, is adjusted to ensure that it is approximately the same as the final, steady-state value of the output voltage of the integrator circuit 22 which, as stated above, has a value corresponding to the level of the ambient background noise. By so doing, it is made certain that the amount of attenuation provided by the variable attenuation circuit 18, which varies in accordance with the value of the feedback output voltage of the time delay circuit 21, has a final, steady-state value which also corresponds to the level of the ambient background noise, as represented by the final, steady-state voltage of the integrator circuit 22. The above voltage adjusting operation is accomplished by the voltage equalization circuit 25 which receives an output signal from the threshold detector circuit 23 while the threshold detector circuit 23 is operating to cause de-energization of the indicator 6. The voltage equalization circuit 25 operates in response to the output signal from the threshold detector circuit 23 to adjust the output voltage of the time delay circuit 21 to have substantially the same value as the output voltage of the integrator circuit 22.

VEHICLE DETECTION OPERATION—FIG. 3

After the above described voltage adjusting step, the presence of a vehicle in the region of surveillance 8 may be detected. When a vehicle enters the region of surveillance 8 of the signal-receiving horn member 4, for example, as indicated by the automobile 10 in FIGS. 1 and 2, the various signals including ultrasonic signals produced naturally and inherently by the vehicle are received by the signal-receiving horn member 4 and applied to the piezoelectric crystal transducer 15. The piezoelectric crystal transducer 15 preferably has a fundamental excitation or resonant frequency of 40 kilohertz, this particular value of excitation frequency being preferred inasmuch as all existing engine-driven road vehicles, including automobiles, trucks, buses, motorcycles, and motorbikes, naturally generate ultrasonic signals having a frequency of 40 kilohertz. However, since ultrasonic signals of other frequencies are also generated naturally by existing engine-driven road vehicles, for example, 50–60 kilohertz, it is contemplated that the piezoelectric crystal transducer 15 have a fundamental excitation frequency other than 40 kilohertz. A particularly suitable 40 kilohertz piezoelectric crystal transducer and mounting structure therefor which may be employed in the present invention is sold by Massa, Inc., Hingham, Massachusetts, under the designation MK 109. The 40 kilohertz piezoelectric crystal transducer 15 operates in response to the signals received via the signal-receiving horn member 4 to produce an output voltage which is greatest for ultrasonic signals of the excitation frequency of 40 kilohertz. Since the piezoelectric transducer 15 has a narrow bandwidth, and since the response-frequency bandwidth of the piezoelectric transducer 15 is difficult to control or predict and may vary from transducer to transducer due to physical dimensioning problems associated with the manufacture of piezoelectric crystal transducers, the output voltage produced by the 40 kilohertz piezoelectric crystal transducer 15 is applied to the tuned resonant circuit 16, having a tuned resonant frequency of 40 kilohertz, which provides an electrical output signal of the desired system bandwidth. By way of example, the tuned circuit 16 may include a 40 millihenry coil having one end connected in series with the piezoelectric transducer 15 and an 82 kilohm resistor connected between the other end of the 40 millihenry coil and ground potential, this arrangement providing a 6 kilohertz, 6db bandwidth centered at 40 kilohertz. The output signal from the tuned circuit 16 is then applied to the amplifier circuit 17 and amplified thereby to a level suitable for further processing. The amplifier circuit 17 may typically comprise two conventional transistor class A amplifier stages arranged in cascade, with the components of the amplifier stages being selected to provide a 40 db ($10^2$) voltage gain.

The amplified "vehicle" output signal produced by the amplifier circuit 17 is applied to the variable attenuation circuit 18 and attenuated thereby by an amount in accordance with the final, steady-state value of attenuation previously established therefor during the noise compensating operation. It is to be noted that during the present vehicle detection operation, a noise voltage signal is also produced by the ultrasonic input signal arrangement 12, due to the presence of the ambient background noise, but this signal is essentially completely attenuated by the variable attenuation circuit 18 due to the earlier adjustment of the attenuation value of the variable attenuation circuit 18 to compensate for the ambient background noise. The attenuated signal produced at the output of the variable attenuation circuit 18 in response to the "vehicle" voltage signal from the amplifier circuit 17 is applied to the amplifier circuit 19, amplified thereby, and applied to the current switch circuit 20. The current switch circuit 20 then operates, in the same manner as previously described in connection with the noise compensating operation, to supply current to the integrator circuit 22 and also to the time delay circuit 21.

The integrator circuit 22 operates in response to the current from the current switch circuit 20 to increase the value of its output voltage from its last steady-state value as established during the noise compensating operation, (that is, a value corresponding to the level of the ambient background noise), to a value exceeding the value of the input threshold voltage level of the threshold detector circuit 23. As the output voltage produced by the integrator circuit 22 reaches the threshold voltage level of the threshold detector circuit 23, an output signal is produced by the threshold detector circuit 23 and applied to the driver circuit 24. The driver circuit 24 then operates to energize the indicator 6, thereby indicating to the operator of the vehicle that an approaching vehicle is present in the region of surveillance 8 associated with the horn member 4. To insure that the indicator 6 is not prematurely de-energized before the vehicle has left the region of surveillance 8, the time delay circuit 21, which also receives current from the current switch circuit 20, is constructed to have a long time delay value which prevents any change in the attenuation value of the variable attenuation circuit 18 from its previously established steady-state value while the approaching vehicle is present in the region of surveillance 8 and while the attenuated "vehicle" output signal from the variable attenuation circuit 18 is being processed by the various circuit 19–24 thereby to energize the indicator 6. By way of example, the time delay circuit 21 may have a time delay value of 2 minutes, a value which is longer than the time that a vehicle normally remains in the region of surveillance 8.

After the vehicle has left the region of surveillance 8, the amplitudes of the output signals produced by the piezoelectric crystal transducer 15 and the various circuits 16–20 become reduced, and the output voltage of the integrator circuit 22 again decreases to its steady-state noise-compensated value, that is, a value corresponding to the level of the ambient background noise. As the output voltage of the integrator circuit 22 decreases below the value of the input threshold voltage level of the threshold detector circuit 23, the output signal previously produced by the threshold detector circuit 23 is terminated, the driver circuit 24 is inactivated, and the indicator 6 is de-energized. To once again ensure that the output voltage of the time delay circuit 21 is approximately equal to the output voltage of the integrator circuit 22, in preparation for detecting the next vehicle entering the region of surveillance 8, the voltage equalization circuit 25 is again operated by an output signal from the threshold detector circuit 23 to adjust the value of the output voltage of the time delay circuit 21 so as to be approximately the same as that of the integrator circuit 22.

As will also be described hereinafter, in addition to the abovementioned operations of the voltage equalization circuit 25, the voltage equalization circuit 25 also operates to adjust the output voltage of the time delay circuit 21 so as to have substantially the same value as the output voltage of the integrator circuit 22 in a situation where the level of the ambient background noise decreases in value, particularly sudden decreases, and causes a reduction in the value of the output voltage of the integrator circuit 22 below that of the time delay circuit 21. In this case the output voltage of the time delay circuit 21 is very quickly adjusted by the voltage equalization circuit 25 to have substantially the same value as the output voltage of the integrator circuit 22 thereby quickly adjusting the attenuation value of the variable attenuation circuit 18 and quickly preparing the signal processing arrangement 5 for processing the various signals derived from an approaching vehicle. The voltage equalization circuit 25 also serves to prevent an excessive build-up of the output voltage of the time delay circuit 21 due, for example, to several vehicles entering and leaving the region of surveillance in very rapid succession, by adjusting the output voltage of the time delay circuit 21 at any time the value of this voltage differs from the value of the output voltage of the integrator circuit 22 by more than a predetermined quantity, for example, a fraction of a volt.

Figure 4:
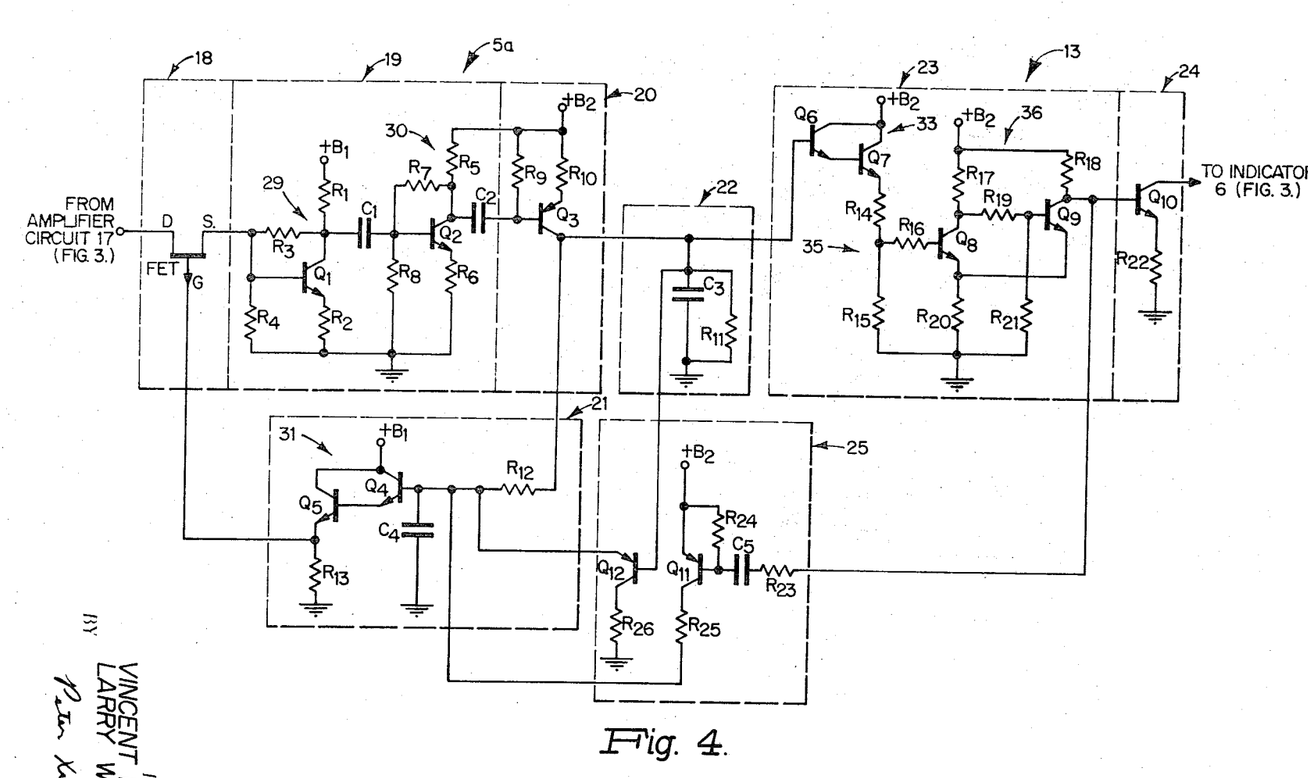
FIG. 4 is a detailed schematic circuit diagram of the ambient noise compensating arrangement and an output signal arrangement employed in the ultrasonic receiving arrangement shown in FIG. 3.

AMBIENT NOISE COMPENSATING ARRANGEMENT AND OUTPUT SIGNAL ARRANGEMENT—FIG. 4

Referring now to FIG. 4, there is shown in schematic diagram form a particularly suitable and preferred implementation of the ambient noise compensating arrangement 5a and the output signal arrangement 13 shown in FIG. 3.

As indicated in FIG. 4, the variable attenuation circuit 18 comprises an n-type field effect transistor FET having a drain electrode D coupled to the amplifier circuit 17 (FIG. 3), a source electrode S, and a gate electrode G. Output signals produced at the source electrode S of the field effect transistor FET in response to signals presented to the drain electrode D are amplified by the amplifier circuit 19 which, in accordance with a preferred design, includes a pair of cascaded amplifier stages 29 and 30, arranged for conventional Class A operation. The amplifier stage 29 includes an npn amplifying transistor $Q_1$ having its base directly coupled to the source electrode S of the field effect transistor FET, its collector coupled via a resistor $R_1$ to a source of positive dc voltage $+B_1$, and its emitter coupled via a biasing and gain-setting resistor $R_2$ to ground potential. Biasing resistors $R_3$ and $R_4$ are also provided between the base and collector and between the base and emitter, respectively, of the amplifying transistor $Q_1$ for establishing appropriate biasing levels for the amplifying transistor $Q_1$. The output of the amplifier stage 29, produced at the collector of the amplifying transistor $Q_1$, is coupled to the amplifier stage 30 by an ac coupling capacitor $C_1$. The amplifier stage 30 is similar to the amplifier stage 29 and includes an npn amplifying transistor $Q_2$ having its base directly coupled to the ac coupling capacitor $C_1$, its collector coupled via a resistor $R_5$ to a second source of positive dc voltage $+B_2$, and its emitter coupled via a biasing and gain-setting resistor $R_6$ to ground potential. Biasing resistors $R_7$ and $R_8$ are connected between the base and collector and between the base and emitter, respectively, of the amplifying transistor $Q_2$ for establishing appropriate biasing levels for the amplifying transistor $Q_2$. The output of the amplifier stage 30, produced at the collector of the amplifying transistor $Q_2$, is coupled to the current switch circuit 20 by an ac coupling capacitor $C_2$. A suitable value of gain for the amplifier circuit 19 is 40db ($10^2$).

The current switch circuit 20 comprises a pnp switching transistor $Q_3$ having its base directly coupled to the ac coupling capacitor $C_2$ and also to the second source of positive dc voltage $+B_2$ through a biasing resistor $R_9$, its emitter coupled to the second source of positive dc voltage $+B_2$ through a current-limiting resistor $R_{10}$, and its collector coupled to the integrator circuit 22 and also to the time delay circuit 21. The output of the current switch circuit 20 is produced at the collector of the switching transistor $Q_3$.

The integrator circuit 22 comprises a capacitor $C_3$ connected between the collector of the switching transistor $Q_3$ and ground potential, and a bleeder resistor $R_{11}$ connected in parallel with the capacitor $C_3$. The capacitor $C_3$ is selected to have a small value to permit rapid charging thereof in response to current from the switching transistor $Q_3$.

The time delay circuit 21 comprises a resistor $R_{12}$ having one end thereof directly coupled to the collector of the switching transistor $Q_3$, a capacitor $C_4$ connected between the opposite end of the resistor $R_{12}$ and ground potential, and an impedance-matching circuit 31 connected between the ungrounded end of the capacitor $C_4$ and ground potential and also to the gate electrode G of the field effect transistor FET. The resistor $R_{12}$ and the capacitor $C_4$ are selected to have large values so as to establish a charging rate for the capacitor $C_4$ in response to current from the switching transistor $Q_3$ which is slow compared with the charging rate for the capacitor $C_3$, thereby establishing a long time delay for the time delay circuit 21, and also to establish a slow discharging rate for the capacitor $C_4$. The impedance-matching circuit 31, which serves to match the impedance looking toward the capacitor $C_4$ with the impedance looking into the gate electrode G of the field effect transistor FET, includes a pair of npn transistors $Q_4$ and $Q_5$ interconnected with each other and to the source of positive dc voltage $+B_1$ in a conventional Darlington emitter-follower configuration. In addition, a resistor $R_{13}$ is provided between the emitter of the transistor $Q_5$ and ground potential to insure that the voltage at the gate electrode G of the field effect transistor FET is always above ground potential.

The threshold detector circuit 23 of FIG. 4 comprises an impedance-matching circuit 33, a resistive voltage divider circuit 35 coupled to the impedance-matching circuit 33, and a Schmitt trigger circuit 36 coupled to the resistive voltage divider circuit 35. The impedance-matching circuit 33, which serves to match the impedance looking into the integrator circuit 22 with the impedance looking into the resistive voltage divider circuit 35, comprises a pair of npn transistors $Q_6$ and $Q_7$ interconnected with each other and to the source of positive dc voltage $+B_2$ in a conventional Darlington emitter-follower configuration. The resistive voltage divider circuit 35 comprises a pair of resistors $R_{14}$ and $R_{15}$ connected in series between the emitter of the transistor $Q_7$ and ground potential.

The Schmitt trigger circuit 36, of conventional design, comprises a pair of npn switching transistors $Q_8$ and $Q_9$, an input resistor $R_{16}$ connected between the base of the switching transistor $Q_8$ and the juncture of the voltage divider resistors $R_{14}$ and $R_{15}$, load resistors $R_{17}$ and $R_{18}$ respectively connected between the collectors of the switching transistors $Q_8$ and $Q_9$ and the source of positive dc voltage $+B_2$, a coupling resistor $R_{19}$ connected between the collector of the switching transistor $Q_8$ and the base of the switching transistor $Q_9$, a common-emitter resistor $R_{20}$ connected between the emitters of the switching transistors $Q_8$ and $Q_9$ and ground potential, and a resistor $R_{21}$ connected between the base of the switching transistor $Q_9$ and ground potential. The switching transistor $Q_8$ of the Schmitt trigger circuit 36 normally operates in a high-impedance, non-conducting state and the switching transistor $Q_9$ normally operates in a low-impedance, conducting state until such time as a voltage level is established at the base of the switching transistor $Q_8$ which exceeds a predetermined threshold value. When this condition occurs, the switching transistor $Q_8$ is caused to switch to its low-impedance, conducting state and the switching transistor $Q_9$ is caused to switch to its high-impedance, non-conducting state. In the present invention, the threshold voltage required to switch the transistors $Q_8$ and $Q_9$ from their initial operating states to their opposite operating states is established by the impedance-matching circuit 33 and the resistive voltage divider circuit 35. The value of voltage required at the base of the impedance-matching Darlington transistor $Q_6$ to cause the above switching operations to take place, that is, the value of the input threshold voltage level of the threshold detector circuit 23, is established to be less than the maximum value and greater than the minimum value of voltage established across the capacitor $C_3$ during the noise compensating operation and also during the subsequent vehicle detection operation. The output of the Schmitt trigger circuit 36, produced at the collector of the switching transistor $Q_9$, is applied to the driver circuit 24 and to the voltage equalization circuit 25.

The driver circuit 24 comprises an npn driver transistor $Q_{10}$ having its base coupled to the collector of the switching transistor $Q_9$, its emitter coupled to ground potential through a resistor $R_{22}$, and its collector coupled to the indicator 6 (FIG. 3). The indicator 6 is energized when the driver transistor $Q_{10}$ is forward biased into its conducting state. The voltage equalization circuit 25 includes a pair of pnp switching transistors $Q_{11}$ and $Q_{12}$. The base of the switching transistor $Q_{11}$ is coupled to the collector of the switching transistor $Q_9$ through a capacitor $C_5$ and a resistor $R_{23}$, and also to the source of positive dc voltage $+B_2$ through a resistor $R_{24}$. The capacitor $C_5$ is selected to have a small value to establish a fast charging rate therefor. The emitter of the switching transistor $Q_{11}$ is connected directly to the source of positive dc voltage $+B_2$, and the collector is coupled to the ungrounded end of the capacitor $C_4$ through a resistor $R_{25}$. The base of the switching transistor $Q_{12}$ is connected directly to the un-grounded end of the capacitor $C_3$, the emitter is connected directly to the juncture of the resistor $R_{12}$ and the capacitor $C_4$, and the collector is coupled to ground potential through a resistor $R_{26}$. The operation of the various circuits 18–25 shown in FIG. 4 is as follows.

Prior to the detection of a vehicle, a noise voltage signal representative of the prevailing ambient background noise is produced at the output of the amplifier circuit 17 (FIG. 3) and applied to the drain electrode D of the field effect transistor FET. Since a low-level signal is present at the gate electrode G of the field effect transistor FET at this time, the noise voltage signal at the drain electrode D is attenuated very slightly (for example, 3db due to inherent quiescent resistance of the field effect transistor FET) and applied to the source electrode S. The noise voltage signal at the source electrode S is presented to the base of the npn amplifying transistor $Q_1$, amplified thereby, and coupled through the ac coupling capacitor $C_1$ to the base of the npn amplifying transistor $Q_2$. The amplified signal at the base of the amplifying transistor $Q_2$ is further amplified by the amplifying transistor $Q_2$ and coupled through the ac coupling capacitor $C_2$ to the base of the pnp switching transistor $Q_3$.

The amplified signal at the base of the switching transistor $Q_3$ is sufficiently negative with respect to the emitter so as to cause the switching transistor $Q_3$ to be forward-biased into its conducting state. As a result, collector current flow is established in the switching transistor $Q_3$ via a current path extending from the source of positive dc voltage $+B_2$, through the current-limiting resistor $R_{10}$, and between the emitter and collector of the switching transistor $Q_3$. The collector current of the switching transistor $Q_3$ is applied to the capacitor $C_3$ and also to the capacitor $C_4$ via the resistor $R_{12}$.

The capacitor $C_3$, due to its relatively small value, is charged very quickly by the collector current from the switching transistor $Q_3$, causing a voltage to be developed progressively thereacross having a value which rapidly approaches the value of the source of positive dc voltage $+B_2$. As the value of the voltage developed across the capacitor $C_3$ reaches the input threshold voltage level of the threshold detector circuit 23, the base-emitter voltages of the impedance-matching transistors $Q_6$ and $Q_7$ are exceeded, causing the transistors $Q_6$ and $Q_7$ to operate in their conducting states, and a voltage is established at the juncture of the voltage-divider resistors $R_{14}$ and $R_{15}$ which is sufficient to cause the switching transistor $Q_8$ to switch from its normally high-impedance, non-conducting state to its low-impedance, conducting state and to cause the switching transistor $Q_9$ to switch from its normally low-impedance, conducting state to its high-impedance, non-conducting state.

As the switching transistor $Q_9$ switches to its high-impedance, non-conducting state, the voltage at the base of the driver transistor $Q_{10}$ becomes sufficiently positive with respect to the emitter so as to forward bias the driver transistor $Q_{10}$ into its conducting state. With the driver transistor $Q_{10}$ operating in its conducting state, the indicator 6 (FIG. 3) is energized. The energization of the indicator 6 at this time serves to inform the operator of the vehicle that the noise compensation operation has been initiated. The indicator 6 remains energized until the voltage developed across the capacitor $C_3$ drops below the input threshold voltage level of the threshold detector circuit 23, as will now be described.

The current supplied by the switching transistor $Q_3$ to the capacitor $C_4$ (via the resistor $R_{12}$) causes a voltage to be developed progressively across the capacitor $C_4$. After a fixed period of time, determined primarily by the values of the capacitor $C_4$ and the resistor $R_{12}$, the voltage developed across the capacitor $C_4$ is coupled via the impedance-matching circuit 31, both transistors of which are caused to conduct by the voltage across the capacitor $C_4$, to the gate electrode G of the field effect transistor FET. The voltage present at the gate electrode of the field effect transistor FET causes the resistance between the drain electrode D and the source electrode S to progressively increase and to attenuate the noise voltage signal present at the drain electrode D. As the amount of attenuation provided by the field effect transistor FET increases, the amplitudes of the output voltages of the amplifying transistors $Q_1$ and $Q_2$ become reduced, and the amount of current supplied by the switching transistor $Q_3$ to the capacitors $C_3$ and $C_4$ becomes reduced as the switching transistor $Q_3$ starts to operate in its high-impedance, non-conducting state. As a result, the capacitor $C_3$ starts to discharge through the bleeder resistor $R_{11}$ causing the voltage thereacross to progressively decrease. Since the switching transistor $Q_3$ is not completely cut off, due to the presence at its base of a small amount of steady-state current of a value directly proportional to the level of the ambient background noise, the voltage across the capacitor $C_3$ drops to a final, steady-state value which is also directly proportional to the level of the ambient background noise. In a similar fashion as described above, the capacitor $C_4$ also discharges, through the resistor $R_{12}$ and also through the bleeder resistor $R_{11}$, but not as quickly as the capacitor $C_3$ due to the large value selected for the resistor $R_{12}$.

As the voltage across the capacitor $C_3$ decreases below the input threshold voltage level of the threshold detector circuit 23, the impedance-matching transistors $Q_6$ and $Q_7$ become non-conducting, and the voltage previously established at the base of the switching transistor $Q_8$ by the resistive voltage divider 35 drops below the input threshold level of the Schmitt trigger circuit 36. As a result, the switching transistor $Q_8$ switches back to its high-impedance, non-conducting state and the switching transistor $Q_9$ switches back to its low-impedance, conducting state. As the switching transistor $Q_9$ switches back to its low-impedance, conducting state, the voltage at the base of the driver transistor $Q_{10}$ decreases, causing the driver transistor $Q_{10}$ to become reverse biased into its non-conducting state. As a result, the indicator 6 is de-energized.

As the switching transistor $Q_9$ of the Schmitt trigger circuit 36 switches back to its conducting state to initiate de-energization of the indicator 6, the voltage at the collector of the switching transistor $Q_9$ is applied to the switching transistor $Q_{11}$ to initiate adjustment of the value of the voltage across the capacitor $C_4$ so as to approximate the value of the voltage across the capacitor $C_3$ which, as stated hereinabove, is proportional to the level of the ambient background noise. More specifically, the voltage at the collector of the switching transistor $Q_9$ is coupled into the base of the transistor $Q_{11}$, via the resistor $R_{23}$ and the capacitor $C_5$, and is sufficiently negative with respect to the emitter of the transistor $Q_{11}$ so as to forward bias the transistor $Q_{11}$ into its conducting state. As the transistor $Q_{11}$ is operated in its conducting state, the capacitor $C_4$ is charged toward the value of the source of positive dc voltage $+B_2$ via a current path extending from the source of positive dc voltage $+B_2$, between the emitter and collector of the transistor $Q_{11}$, and through the resistor $R_{25}$ to the capacitor $C_4$. At the same time as the above action takes place, the capacitor $C_5$ is quickly charged by current flow through the resistor $R_{24}$, causing a positive voltage to be developed thereacross. When the value of the voltage across the capacitor $C_5$ and, thus, at the base of the transistor $Q_{11}$, becomes sufficiently positive with respect to the emitter of the transistor $Q_{11}$, the transistor $Q_{11}$ is reverse biased into its non-conducting state thereby terminating current flow into the capacitor $C_4$ and, therefore, terminating the build-up of voltage across the capacitor $C_4$. To render the final voltage developed across the capacitor $C_4$ approximately equal to the value of the voltage across the capacitor $C_3$, the transistor $Q_{12}$ is so connected at its base and emitter with the capacitors $C_3$ and $C_4$ as to be forward biased into conduction for as long as the value of the voltage across the capacitor $C_4$ is greater than the value of the voltage across the capacitor $C_3$ by an amount equal to the value of the forward-bias base to emitter voltage (typically 0.6 volts) of the transistor $Q_{12}$. As the transistor $Q_{12}$ is rendered conducting, a discharge path is provided for the capacitor $C_4$ through the conducting transistor $Q_{12}$ and the resistor $R_{26}$ to ground potential, and the excessive charge on the capacitor $C_4$ is removed until the voltage thereacross no longer exceeds the voltage across the capacitor $C_3$ by more than the aforementioned amount. In the above fashion, the voltage applied to the gate electrode G of the field effect transistor FET is maintained at a value substantially equal to the value of the voltage across the capacitor $C_3$, that is, a value directly proportional to the level of the ambient background noise, thereby insuring that the amount of attenuation provided by the field effect transistor FET is not altered from its desired value corresponding to the level of the ambient background noise.

After the completion of the noise compensating operation as described above, vehicle detection may be readily accomplished. The "vehicle" output signal produced by the amplifier circuit 17 (FIG. 3) as a result of signals being received from a vehicle by the signal-receiving horn member 4 (FIG. 3) is applied to the drain electrode D of the field effect transistor FET and attenuated at the source electrode S by an amount in accordance with the value of attenuation previously established for the field effect transistor FET during the noise compensating operation. The attenuated "vehicle" signal at the source electrode S is then presented to the base of the amplifying transistor $Q_1$, amplified thereby, and coupled through the ac coupling capacitor $C_1$ to the base of the amplifying transistor $Q_2$. The amplified signal at the base of the amplifying transistor $Q_2$ is further amplified by the amplifying transistor $Q_2$ and coupled through the ac coupling capacitor $C_2$ to the base of the switching transistor $Q_3$.

The amplified signal at the base of the switching transistor $Q_3$ forward biases the switching transistor $Q_3$ more fully in its conducting state thereby establishing increased current flow from the source of positive dc voltage $+B_2$ to the capacitor $C_3$ and also to the capacitor $C_4$. In response to the increased current from the switching transistor $Q_3$, the capacitor $C_3$ operates to increase the voltage thereacross from its last, steady-state value, as established during the noise compensating operation, (that is, a value directly proportional to the level of the ambient background noise), to a value exceeding the value of the input threshold voltage level of the threshold detector circuit 23. As the output voltage across the capacitor $C_3$ exceeds the input threshold voltage level of the threshold detector circuit 23, the impedance-matching transistors $Q_6$ and $Q_7$ are caused to conduct, and a voltage is established by the resistive voltage divider circuit 35 at the base of the switching transistor $Q_8$ which exceeds the input threshold level of the Schmitt trigger circuit 36. As a result, the switching transistor $Q_8$ switches to its conducting state and the switching transistor $Q_9$ switches to its non-conducting state. As the switching transistor $Q_9$ switches to its non-conducting state, the driver transistor $Q_{10}$ is operated in its conducting state and the indicator 6 is energized thereby informing the operator of the vehicle of the presence of the approaching vehicle in the region of surveillance.

It is to be noted that while the voltage across the capacitor $C_3$ is increased due to the increased current from the switching transistor $Q_1$, as discussed above, the voltage across the capacitor $C_4$ is also increased from its last value as established during the noise compensating operation due to current received from the switching transistor $Q_3$. However, due to the large values selected for the capacitor $C_4$ and the resistor $R_{12}$, and the resulting long time delay provided thereby (e.g., 2 minutes), the attenuation value of the field effect transistor FET is prevented from being further increased, that is, from its steady-state noise-compensated value, while the vehicle is present in the region of surveillance and while the attenuated "vehicle" output signal at the source electrode S of the field effect transistor FET is being processed by the various circuits 19-24 so as to cause energization of the indicator 6. In this fashion, the indicator 6 is not prematurely de-energized while the approaching vehicle is still present in the region of surveillance.

After the vehicle has left the region of surveillance, the values of the output voltage signals of the various circuits 17-20 decrease, and the voltage across the capacitor $C_3$ decreases to its steady-state, noise-compensated value. As the voltage across the capacitor $C_3$ drops below the value of the input threshold voltage level of the threshold detector circuit 23, the impedance-matching transistors $Q_6$ and $Q_7$ are operated in their non-conducting states, and the voltage previously established at the base of the switching transistor $Q_8$ by the resistive voltage divider circuit 35 is reduced below the threshold level of the Schmitt trigger circuit 36. As a result, the switching transistor $Q_8$ switches back to its high-impedance, non-conducting state and the switching transistor $Q_9$ switches back to its low-impedance, conducting state. As the switching transistor $Q_9$ switches back to its low-impedance, conducting state, the driver transistor $Q_{10}$ is operated in its non-conducting state thereby causing the indicator 6 to be de-energized. To once again ensure that the voltage across the capacitor $C_4$ is approximately equal to the voltage across the capacitor $C_3$, in preparation for detecting the next vehicle entering the region of surveillance, the voltage equalization circuit 25 is again operated by the voltage at the collector of the switching transistor $Q_9$, in the same manner as previously described, to adjust the value of the output voltage across the capacitor $C_4$ so as to be approximately the same as that across the capacitor $C_3$.

In addition to the abovedescribed operations of the voltage equalization circuit 25, the voltage equalization circuit 25 and, in particular, the switching transistor $Q_{12}$, operates to adjust the voltage across the capacitor $C_4$ so as to have substantially the same value as the voltage across the capacitor $C_3$ in the situation where the level of the ambient background noise decreases in value, particularly sudden decreases, and causes a reduction in the value of the voltage across the capacitor $C_3$ below that of the capacitor $C_4$. In this case, if the voltage across the capacitor $C_4$ is greater than the voltage across the capacitor $C_3$ by more than the value of the base to emitter voltage of the transistor $Q_{12}$ (e.g., 0.6 volts), the switching transistor $Q_{12}$ conducts and quickly establishes a discharge path for the charge in the capacitor $C_4$, in the same manner as previously described, thereby to reduce the voltage across the capacitor $C_4$ to a value substantially equal to that across the capacitor $C_3$. The switching transistor $Q_{12}$ additionally serves to prevent an excessive buildup of voltage across the capacitor $C_4$ due, for example, to several vehicles entering and leaving the region of surveillance 8 in very rapid succession, by adjusting the value of the voltage across the capacitor $C_4$ at such time as the voltage across the capacitor $C_4$ increases in value beyond the value of the voltage across the capacitor $C_3$ by an amount exceeding the base to emitter voltage of the switching transistor $Q_{12}$.

Some typical values for the parameters of the components employed in the ambient noise compensating arrangement 5a and the output signal arrangement 13 shown in FIG. 4 are as follows:

| FET | 2N5462 | $R_9$ | 47 kilohms |
|---|---|---|---|
| $Q_1$ | 2N3641 | $R_{10}$ | 1 kilohm |
| $Q_2$ | 2N3641 | $R_{11}$ | 680 kilohms |
| $Q_3$ | 2N3638 | $R_{12}$ | 2.2 megohms |
| $Q_4, Q_5$ | D16PC2 (General Electric) | $R_{13}$ | 100 kilohms |
| $Q_6, Q_7$ | D16PC2 (General Electric) | $R_{14}$ | 680 ohms |
| $Q_8$ | 2N3641 | $R_{15}$ | 220 ohms |
| $Q_9$ | 2N3641 | $R_{16}$ | 1 kilohm |
| $Q_{10}$ | 2N697 | $R_{17}$ | 1 kilohm |
| $Q_{11}$ | 2N3638 | $R_{18}$ | 820 ohms |
| $Q_{12}$ | 2N3638 | $R_{19}$ | 1 kilohm |
| $R_1$ | 1 kilohm | $R_{20}$ | 68 ohms |
| $R_2$ | 68 ohms | $R_{21}$ | 1 kilohm |
| $R_3$ | 3.3 kilohms | $R_{22}$ | 27 ohms |
| $R_4$ | 1 kilohm | $R_{23}$ | 10 kilohms |
| $R_5$ | 3.3 kilohms | $R_{24}$ | 33 kilohms |
| $R_6$ | 47 ohms | $R_{25}$ | 1 kilohm |
| $R_7$ | 1.2 kilohms | $R_{26}$ | 3.3 kilohms |
| $R_8$ | 6.8 kilohms | | |

| $C_1$ | 0.047 microfarads |
|---|---|
| $C_2$ | 0.1 microfarads |
| $C_3$ | 1 microfarad |
| $C_4$ | 75 microfarads |
| $C_5$ | 1 microfarad |
| $+B_1$ | +9 volts |
| $+B_2$ | +12 volts |

While there has been shown and described what is considered a preferred embodiment of the present invention, it will be obvious to those skilled in the art that various changes and modifications may be made therein without departing from the invention as called for in the appended claims.

What is claimed is:

1. In a passive object detection apparatus associated with a first object for detecting and indicating, in the presence of ambient noise signals, the presence of another object in a region of surveillance adjacent to the first object, said another object inherently generating signals, said passive object detection apparatus including signal-receiving means for receiving the ambient noise signals and the signals generated inherently by said object while present in the region of surveillance, signal processing apparatus comprising:

input means adapted to receive from the signal-receiving means the signals received thereby and operative in response to said signals to produce voltage signals representative thereof;

attenuation means adapted to receive the voltage signals produced by the input means and operative in response to signals received thereby to attenuate ambient noise signals by an amount in accordance with the amplitude thereof when said signals have a duration exceeding a predetermined time duration and operative to attenuate subsequent object signals received thereby by only said establishment amount of ambient noise signal attenuation when the subsequent signals have a duration equal to or less than the predetermined ambient noise signal time duration; and output means coupled to the attenuation means and operative during the operation of said attenuation means to attenuate the ambient noise signals having a duration exceeding the predetermined time duration to produce a first output indication, and operative during the operation of the attenuation means to attenuate the object signals having a duration equal to or less than the predetermined ambient noise signal time duration by only said amount of ambient noise signal attenuation to produce a second output indication.

2. In a passive object detection apparatus associated with a first object for detecting and indicating, in the presence of ambient noise, the presence of another object in a region of surveillance adjacent to the first object, said another object inherently generating signals of a time duration less than the time duration of the ambient noise, said passive object detection apparatus including signal-receiving means for receiving the ambient noise and the signals generated inherently by said another object while present in the region of surveillance, signal processing apparatus comprising:

input means adapted to receive from the signal-receiving means the ambient noise received thereby and operative in response to said ambient noise to produce a first voltage signal representative thereof;

attenuation means coupled to the input means and including means for discriminating on the basis of time duration, between signals produced by the input means in response to ambient noise and in response to signals generated by an object in the region of surveillance, said attenuation means being adapted to receive a first voltage signal representing ambient noise and being operative in response to the first voltage signal to attenuate the first voltage signal by an amount in accordance with the amplitude thereof;

said input means also receiving from the signal-receiving means signals generated inherently by an object while the object is present in the region of surveillance adjacent to the first object, said input means operating in response to said signals representative of said object to produce a second voltage signal representative thereof;

said attenuation means also receiving the second voltage signal and operating in response thereto to attenuate the second voltage signal by an amount substantially equal to the attenuation of said first voltage signal; and means for processing the attenuated second voltage signal to provide an indication of the presence of the object in the region of surveillance adjacent to the first object.

3. In a passive object detection apparatus associated with a first object for detecting and indicating, in the presence of ambient noise, the presence of another object in a region of surveillance adjacent to the first object, said another object inherently generating signals of a time duration less than the time duration of the ambient noise, said passive object detection apparatus including signal-receiving means for receiving the ambient noise and the signals generated inherently by said another object while present in the region of surveillance, signal processing apparatus comprising:

input means adapted to receive from the signal-receiving means the ambient noise received thereby and operative in response to said ambient noise to produce a first voltage signal representative thereof;

attenuation means coupled to the input means and including means for discriminating, on the basis of time duration, between signals produced by the input means in response to ambient noise and in response to signals generated by an object in the region of surveillance, said attenuation means being operative in response to the first voltage signal to attenuate the first voltage signal by an amount in accordance with the amplitude thereof; and means coupled to the attenuation means and operative during the operation of the attenuation means to attenuate the first voltage signal to provide an indication that the attenuation operation is taking place;

said input means also receiving from the signal-receiving means signals generated inherently by an object while the object is present in the region of surveillance adjacent to the first object, said input means operating in response to said signals to produce a second voltage signal representative thereof;

said attenuation means also receiving the second voltage signal and operating in response thereto to attenuate the second voltage signal by the aforesaid amount of attenuation of said first voltage signal; and means for processing the attenuated second voltage signal to provide an indication of the presence of the object in the region of surveillance adjacent to the first object.

4. In a passive object detection apparatus associated with a first object for detecting and indicating, in the presence of ambient noise, the presence of another object in a region of surveillance adjacent to the first object, said another object inherently generating signals, said passive object detection apparatus including signal-receiving means for receiving the ambient noise and the signals generated inherently by said object while present in the region of surveillance, signal processing apparatus comprising:

input means adapted to receive from the signal-receiving means the ambient noise received thereby and operative in response to said ambient noise to produce a first voltage signal representative thereof;

attenuation circuit means having an input connection for receiving the first voltage signal, an output connection, and a control connection, said attenuation circuit means having an essentially non-attenuating operating state in the absence of a voltage at the control connection and an attenuating operating state in the presence of a voltage at the control connection, said attenuation circuit means initially operating in the essentially non-attenuating state and applying said first voltage signal at the input connection thereof to the output connection substantially without attenuation;

first circuit means coupled to the output connection of the attenuation circuit means and operative in response to the first voltage signal at the output connection of the attenuation circuit means to produce a first output signal having an amplitude proportional to the amplitude of the first voltage signal;

output circuit means coupled to the first circuit means and adapted to receive the first output signal produced by the first circuit means, said output circuit means being operative in response to the first output signal to process the first output signal to provide an indication of the fact that compensation for the ambient noise has been initiated; and time delay circuit means coupled between the first circuit means and the control connection of the attenuation circuit means and also receiving the first output signal produced by the first circuit means, said time delay circuit means being operative in response to the first output signal produced by the first circuit means to produce and apply a feedback voltage to the control connection of the attenuation circuit means after a predetermined time delay, said feedback voltage having a value proportional to the amplitude of the first output signal produced by the first circuit means;

said attenuation circuit means being operative in response to the feedback voltage at the control connection thereof to operate in its attenuating operating state and to attenuate the first voltage signal present at its input connection by an amount in accordance with the amplitude of the feedback voltage;

said input means also receiving from the signal-receiving means signal generated inherently by an object while the object is present in the region of surveillance adjacent to the first object, said input means operating in response to said signals to produce a second voltage signal representative thereof;

said attenuation circuit means also receiving the second voltage signal at its input connection and operating in response thereto to attenuate the second voltage signal by the aforesaid amount of attenuation of said first voltage signal;

said first circuit means also receiving the attenuated second voltage signal produced by the attenuation circuit means and operating in response thereto to produce a second output signal having an amplitude proportional to the amplitude of the attenuated second voltage signal;

said output circuit means also receiving the second output signal produced by the first circuit means, said output circuit means operating in response to the second output signal to process the second output signal to provide an indication of the presence of the object in the region of surveillance adjacent to the first object; and said time delay circuit means also receiving the second output signal produced by the first circuit means and operating in response to the second output signal to produce and apply a feedback voltage to the control connection of the attenuating circuit means after the predetermined time delay, thereby preventing any change in the value of attenuation provided by the attenuation circuit means for a period of time equal to the predetermined time delay and while the object is present in the region of surveillance adjacent to the first object.

5. Apparatus in accordance with claim 4 wherein the first circuit means comprises:

amplifier circuit means adapted to amplify each of the first and second voltage signals produced by the attenuation circuit means by a predetermined quantity thereby to provide amplified first and second voltage signals; and current switch circuit means coupled to the amplifier circuit means and operative in response to each of the amplified first and second voltage signals to produce corresponding first and second output current signals, each having a value proportional to the amplitude of the corresponding first or second amplified voltage signal.

6. Apparatus in accordance with claim 4 wherein the output circuit means includes:

integrator circuit means operative in response to each of the first and second output signals produced by the first circuit means to develop corresponding first and second progressively increasing output voltages;

threshold detector circuit means coupled to the integrator circuit means and having a predetermined threshold input voltage level associated therewith above which an output signal is produced thereby, the value of said input threshold voltage level being less than the maximum value of output voltage produced by the integrator circuit means, said threshold detector circuit means being operative when the value of the first or second output voltage produced by the integrator circuit means exceeds the predetermined input threshold voltage level associated therewith to produce an output signal; and means adapted to receive the output signal produced by the threshold detector circuit means and operative in response thereto to provide a sensible output indication.

7. Apparatus in accordance with claim 6 wherein said threshold detector circuit means includes a Schmitt trigger circuit.

8. In a passive object detection apparatus associated with a first object for detecting and indicating, in the presence of ambient noise, the presence of another object in a region of surveillance adjacent to the first object, said another object inherently generating signals, said passive object detection apparatus including signal-receiving means for receiving the ambient noise and the signals generated inherently by said object while present in the region of surveillance, signal processing apparatus comprising:

input means adapted to receive from the signal-receiving means the ambient noise received thereby and operative in response to said ambient noise to produce a first voltage signal representative thereof;

attenuation circuit means having an input connection for receiving the first voltage signal, an output connection, and a control connection, said attenuation circuit means having a non-attenuating operating state in the absence of a voltage at the control connection and an attenuating operating state in the presence of a voltage at the control connection, said attenuation circuit means initially operating in the essentially non-attenuating state and applying said first voltage signal at the input connection thereof to the output connection substantially without attenuation;

first circuit means coupled to the output connection of the attenuation circuit means and operative in response to the first voltage signal at the output connection of the attenuation circuit means to produce a first output signal having an amplitude proportional to the amplitude of the first voltage signal;

integrator circuit means coupled to the first circuit means and adapted to receive the first output signal produced by the first circuit means and operative in response to the first output signal to develop a progressively increasing output voltage;

threshold detector circuit means coupled to the integrator circuit means and having a predetermined input threshold voltage level associated therewith above which an output signal is produced by the threshold detector circuit means and below which said output signal is terminated, the value of said predetermined input threshold voltage level being less than the maximum value of output voltage and more than the minimum value of output voltage produced by the integrator circuit means, said threshold detector circuit means being operative when the value of the first output voltage of the integrator circuit means exceeds the predetermined threshold voltage level associated therewith to produce a first output signal;

indicator circuit means adapted to receive the output signal produced by the threshold detector circuit means and operative in response thereto to provide a first sensible output indication;

time delay circuit means coupled between the first circuit means and the control connection of the attenuation circuit means and also receiving the first output signal produced by the first circuit means, said time delay circuit means being operative in response to the first output signal produced by the first circuit means to produce and apply a feedback voltage to the control connection of the attenuation circuit means after a predetermined time delay, said feedback voltage having a value proportional to the amplitude of the first output signal produced by the first circuit means;

said attenuation circuit means being operative in response to the feedback voltage at the control connection thereof to operate in its attenuating operating state and to attenuate the first voltage signal present at its input connection by an amount in accordance with the amplitude of the feedback voltage, whereby the first circuit means operates to decrease the amplitude of the first output signal produced thereby and the integrator circuit means operates to reduce the value of the output voltage thereof to a minimum value less than the predetermined input threshold voltage level associated with the threshold detector circuit means, thereby causing the threshold detector circuit means to terminate the first output signal produced thereby and causing the indicator circuit means to terminate the first sensible output indication provided thereby;

said input means also receiving from the signal-receiving means signals generated inherently by an object while the object is present in the region of surveillance adjacent to the first object, said input means operating in response to said signals to produce a second voltage signal representative thereof;

said attenuation circuit means also receiving the second voltage signal at its input connection and operating in response thereto to attenuate the second voltage signal by the aforesaid amount;

said first circuit means also receiving the attenuated second voltage signal produced by the attenuation circuit means and operating in response thereto to produce a second output signal having an amplitude proportional to the amplitude of the attenuated second voltage signal;

said integrator circuit means also receiving the second output signal produced by the first circuit means and operating in response thereto to increase the value of its output voltage toward its maximum value, whereby the predetermined threshold voltage level of the threshold detector circuit means is exceeded and a second output signal is produced by the threshold detector circuit means and a second sensible output indication is provided by the indicator circuit means;

said time delay circuit means also receiving the second output signal produced by the first circuit means, said time delay circuit means producing and applying a feedback voltage to the control connection of the attenuation circuit means after the predetermined time delay thereby preventing any change in in the value of attenuation provided by the attenuation circuit means for a period of time equal to the predetermined time delay and while the object is present in the region of surveillance adjacent to the first object; and said first circuit means operating to decrease the value of the second output signal produced thereby and said integrator circuit means operating to reduce the value of the output voltage thereof from its last value and below the input threshold voltage level associated with the threshold detector circuit means when the object leaves the region of surveillance within the predetermined time delay of the time delay circuit means, whereby the second output signal produced by the threshold detector circuit means is terminated and the second sensible output indication provided by the indicator circuit means is terminated.

9. Apparatus in accordance with claim 8 further comprising:
means coupled to the integrator circuit means and to the time delay circuit means and operative when the value of the feedback voltage of the time delay circuit means differs from the value of the output voltage of the integrator circuit means by more than a predetermined quantity to adjust the feedback voltage of the time delay circuit means to have a value differing from the value of the output voltage of the integrator circuit means by the predetermined quantity.

10. Apparatus in accordance with claim 8 further comprising:
voltage equalization circuit means coupled to the integrator circuit means, the threshold detector circuit means, and to the time delay circuit means and operative when an output signal produced by the threshold detector circuit means is terminated to adjust the feedback voltage of the time delay circuit means to have a value differing from the value of the output voltage of the integrator circuit means by a predetermined quantity.

11. Apparatus in accordance with claim 8 wherein:
said signal-receiving means includes a horn member having a frustum configuration; and
said region of surveillance has essentially a frustum configuration.

12. Apparatus in accordance with claim 11 wherein:
said another object is a vehicle and the signals inherently generated thereby include ultrasonic signals; and
wherein said input means includes:
an ultrasonic transducer having a predetermined resonant frequency and operable in response to the ultrasonic signals received from the horn member to produce an output voltage which is greatest for ultrasonic signals of the predetermined resonant frequency.

13. Apparatus in accordance with claim 12 wherein said first object is a vehicle.

14. Apparatus in accordance with claim 13 wherein said ultrasonic transducer is a piezoelectric crystal transducer.

15. Apparatus in accordance with claim 8 wherein the attenuation circuit means includes a field effect transistor in series with the input connection and the output connection thereof.

16. Apparatus in accordance with claim 15 wherein:
the first circuit means includes a transistor amplifier circuit and a transistor current switch circuit;
the integrator circuit means includes a capacitance coupled to the transistor current switch circuit for receiving current from the transistor current switch circuit;
the time delay circuit means includes a resistance and a capacitance coupled to the transistor current switch circuit for receiving current from the current switch circuit; and
the threshold detector circuit means includes a Schmitt trigger circuit coupled to the capacitance included in the integrator circuit means.

17. Apparatus in accordance with claim 16 wherein:
said signal-receiving means includes a horn member having a frustum configuration; and
said region of surveillance has essentially a frustum configuration.

18. Apparatus in accordance with claim 17 wherein:
said another object is a vehicle and the signals inherently generated thereby include ultrasonic signals; and wherein said input means includes:
- an ultrasonic transducer having a predetermined resonant frequency and operable in response to the ultrasonic signals received from the horn member to produce an output voltage which is greatest for ultrasonic signals of the predetermined resonant frequency; and
- tuned resonant circuit means connected to the ultrasonic transducer and having a tuned resonant frequency equal to the resonant frequency of the ultrasonic transducer, said tuned circuit means being operable in response to the output voltage produced by the ultrasonic transducer to produce an output signal of a predetermined bandwidth.

19. Apparatus in accordance with claim 18 wherein said first object is a vehicle.

20. Apparatus in accordance with claim 19 wherein said ultrasonic transducer is a piezoelectric crystal transducer.

21. Apparatus for processing signals present in a predetermined region, comprising:
- signal-receiving means for receiving signals present in the predetermined region;
- input means adapted to receive from the signal-receiving means the signals received thereby and operative in response to said signals to produce voltage signals representative thereof;
- attenuation means adapted to receive the voltage signals produced by the input means and operative in response to the signals received thereby to attenuate signals by an amount in accordance with the amplitude thereof when said signals have a duration exceeding a predetermined time duration and operative to attenuate subsequent signals received thereby by only said established amount in accordance with the amplitude thereof when the subsequent signals have a duration equal to or less than the predetermined time duration; and
- output means operative during the operation of the attenuation means to attenuate the signals having a duration exceeding the predetermined time duration to produce a first output indication and operative during the operation of the attenuation means to attenuate the signals having a duration equal to or less than the predetermined time duration to produce a second output indication.

22. Apparatus in accordance with claim 21 wherein:
- said signal-receiving means includes a horn member having a frustum configuration; and
- the predetermined region has essentially a frustum configuration.

* * * * *